May 7, 1968  W. J. CLOSE  3,381,542
VARIABLE SPEED DRIVE UNIT
Filed Feb. 2, 1966
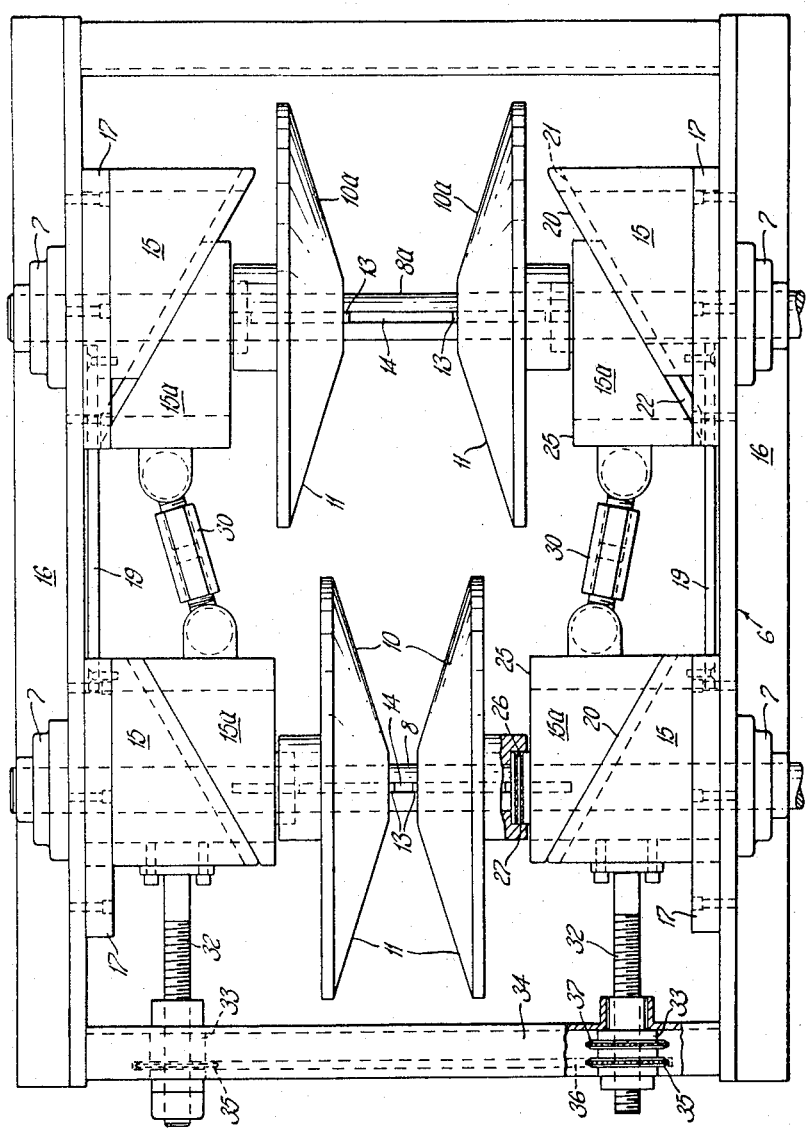
Inventor
William James Close
Watson, Cole, Grindle & Watson
Attorneys United States Patent Office 3,381,542
Patented May 7, 1968

3,381,542
VARIABLE SPEED DRIVE UNIT
William James Close, Kogarah Bay, New South Wales,
Australia, assignor to Permax Molins Proprietary
Limited, Collingwood, Victoria, Australia, a corporation of Victoria
Filed Feb. 2, 1966, Ser. No. 524,565
Claims priority, application Australia, Feb. 4, 1965,
54,727/65
5 Claims. (Cl. 74—230.17)

ABSTRACT OF THE DISCLOSURE

In a variable speed drive unit having V-pulleys mounted on parallel input and output shafts coupled by a belt, each pulley has two sections with variable separation. Axial movement of the pulley sections is controlled by wedge elements moving transversely of the axis of the shafts and coacting with wedge members associated with the pulley sections. The adjacent wedge members of the two pulleys are coupled together to balance the adjustment of the two pulleys, the wedge members and elements being so arranged that the sections of one pulley close together as those of the other separate.

---

This invention relates to a variable speed drive unit or more particularly to one comprising parallel input and output shafts, a pulley coupled to each shaft having two complementary coaxial sections defining a belt engaging surface and axially slidable relative to one another, a belt drive connecting said pulleys, and control means operable at will to effect in unison relative axial movement of the sections of each pulley to increase the effective diameter of the belt engaging surface of one pulley and correspondingly decrease the diameter of the other so as to vary the ratio of the speeds of the input and output shafts.

Variable speed drives of this type are commonly known as "Reeves Drives" and at present several different mechanisms are known by which the effective diameters of the belt engaging surfaces are adjusted but all such are relatively expensive to manufacture.

It is an object of the present invention to provide a variable speed drive which is inexpensive to manufacture, simple and effective in operation and durable in service.

According to the present invention there is provided a variable speed drive unit of the type herein specified having control means comprising a pair of wedge elements associated with each pulley and mounted for sliding movement in unison in a direction transverse to the axis of the pulleys and disposed on opposite sides of the pulleys, means operable at will to effect the movement of the two pair of wedge elements in unison, and means interposed between the respective wedge elements and the adjoining axially movable pulley section to translate the movement of the wedge in the transverse direction to axial movement of the pulley section, the arrangement being such that the effective diameter of the belt engaging surface of one pulley increases and that of the other decreases as the wedge elements move in one direction and vice versa as the wedge elements move in the other direction.

Conveniently the means to translate the transverse movement of the wedge element to axial movement of the adjoining pulley section is a complementary wedge member associated with each wedge element with the inclined face thereof engaging the inclined face of the wedge element. Each wedge member has a face transverse to the axis of the pulley section and a ball thrust bearing is interposed between this face and the pulley section.

A variable speed drive unit in accordance with the invention will now be described by way of example with reference to the accompanying drawing.

In one practical arrangement of the variable speed drive unit as illustrated in the accompanying drawing, the unit comprises the rectangular base frame 6 carrying bearing 7 supporting the two parallel shafts 8 and 8a. Suitable coupling means (not shown) are provided to connect the shafts to a power supply and a machine to be driven respectively.

Each shaft has keyed thereto a pair of complementary pulley sections 10 and 10a which together define a V-shaped belt engaging surface 11. Each pulley section has a key 13 fixed thereto which is slidable in the keyway 14 in the shaft.

The two complementary wedge blocks 15 and 15a interposed between each pulley section and the adjacent side member 16 of the frame are apertured to permit the shaft to project therethrough. Each control wedge block 15 is slidable in the respective guideways 17 in a direction transverse to the axes of the shafts. The aligning control wedge blocks 15 at the corresponding ends of the shafts are coupled to move in unison by the respective bars 19.

The inclined face 20 of each control wedge block 15 has a longitudinal slot 21 extending the full length of the face which receives a complementary tongue 22 on the inclined face of the mating transfer wedge block 15a, so as to retain the blocks in the correct mating relation during relative sliding movement.

The inner face 25 of each transfer wedge block 15a is transverse to the axis of the shaft passing therethrough and engages the ball thrust bearing 26 seated in the recess 27 in the adjoining pulley section. The adjacent transfer wedge blocks 15a are connected by turnbuckles 30 so as to equalize the pressure on the transfer wedge blocks during operation of the drive, and balances the movement of the blocks during speed adjustments.

The two control screws 32 are connected to the respective control wedge blocks and engage nuts 33 journalled in the end member 34 of the frame. Sprocket wheels 35 are attached to each nut and coupled by the chain 36 so that the nuts rotate in unison and thereby effect movement in unison of the control wedge blocks. The sprocket wheels 37 are also attached to one nut and are connected by a chain to a handwheel or crank (not shown) mounted at a suitable location to permit convenient speed control.

In the above construction the effective diameter of the belt engaging surface of each pulley is adjusted by sliding movement of the control wedge blocks 15a in a direction transverse to the axes of the shafts and this movement is transferred to an axial movement of the pulley sections through the respective transfer wedge block 15a.

I claim:
1. A variable speed drive unit comprising two V-pulleys coupled to parallel input and output shafts connected by a belt drive, each pulley having two complementary coaxial sections defining a belt engaging surface, at least one of said sections being axially slidable on its shaft, a wedge element associated with each slidable section and mounted for sliding movement transverse to the axes of the shafts, means operable to move said elements in unison, and a wedge member interposed between each wedge element and its associated pulley section to translate transverse movement of the wedge element to axial movement of the section, corresponding wedge elements on the input and output shafts having their inclined faces sloping in opposite directions so that as the elements move in unison the effective diameter of one pulley increases while that of the other decreases, and a coupling between the wedge member associated with one pulley and the adjoining wedge member associated with the other pulley to balance the movement of the sections.

2. A variable speed drive unit as claimed in claim 1 wherein both sections of each pulley are similarly arranged for movement by associated wedge elements and wedge members.

3. A variable speed unit as claimed in claim 1 in which said coupling between the wedge members comprises a turnbuckle.

4. A variable speed unit as claimed in claim 1, wherein each wedge member has a face transverse to the axes of the shafts and a thrust bearing between this face and its adjacent section.

5. A variable speed unit as claimed in claim 2 wherein said means operable to effect movement of the wedge elements in unison comprises control screws operatively connected to the wedge elements, and means for operating said control screws synchronously whereby said wedge elements slide in a direction transverse to the axes of the shafts in unison.

References Cited

UNITED STATES PATENTS

| | | | |
|---|---|---|---|
| 1,235,794 | 8/1917 | Hardaker | 74—230.17 |
| 1,236,749 | 8/1917 | Osser | 74—230.17 |
| 3,090,246 | 5/1963 | Berens | 74—230.17 |
| 3,267,760 | 8/1966 | Wenning | 74—230.17 |

CORNELIUS J. HUSAR, *Primary Examiner.*